(12) United States Patent  (10) Patent No.: US 6,751,479 B1
Knight  (45) Date of Patent: Jun. 15, 2004

(54) RADIO BASE STATION

(75) Inventor: Clifford Lee Knight, Cape Coral, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 541 days.

(21) Appl. No.: 09/738,057

(22) Filed: Dec. 14, 2000

(51) Int. Cl.[7] .................................................. H04B 1/38
(52) U.S. Cl. ........................ 455/560; 165/159; 165/244; 361/695
(58) Field of Search .................................. 455/561, 90.3, 455/347, 66.1; 361/694, 695, 696, 697; 165/104.33, 121, 122, 159, 244

(56) References Cited

U.S. PATENT DOCUMENTS 4,691,767 A  *  9/1987  Tanaka et al. ............... 165/151

* cited by examiner

*Primary Examiner*—Lee Nguyen
(74) *Attorney, Agent, or Firm*—Cantor Colburn LLP

(57) ABSTRACT

A radio base station having a cabinet and a fan. The cabinet houses wireless communication equipment, and the fan cools the wireless communication equipment. The radio base station also includes at least one vent substantially perpendicular to air flow through the fan. This substantially perpendicularly arranged vent reduces atmospheric/ocean breezes from entering the radio base station and overheating the wireless communication equipment. The radio base station may also include at least one louvered vent having an open position and a closed position, the open position flowing air to or from the fan, and the closed position reducing the flow of air to or from the fan. The wireless communication equipment transmits frequencies between 806–960 MHz, between 1710–1885 MHz, or between 2500–2690 MHz.

19 Claims, 10 Drawing Sheets

FIG. 5
FIG. 5A
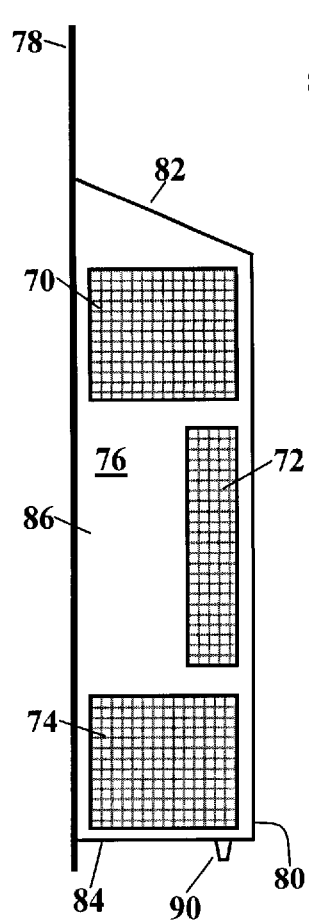
FIG. 5B
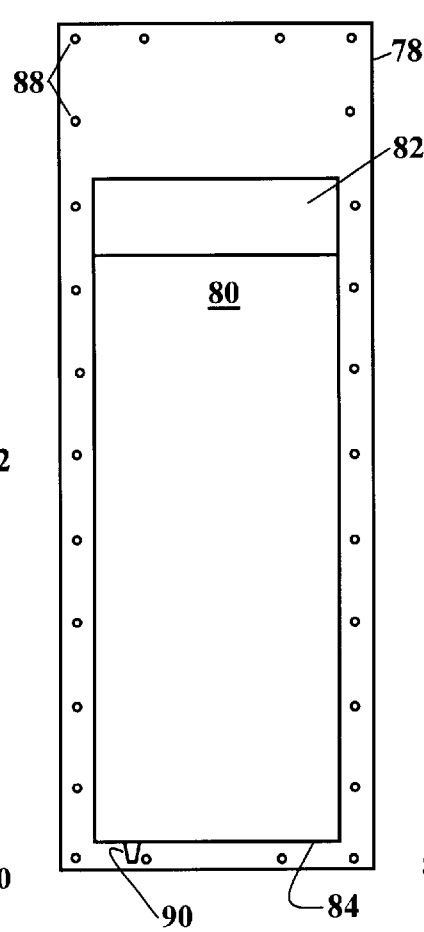
FIG. 5C
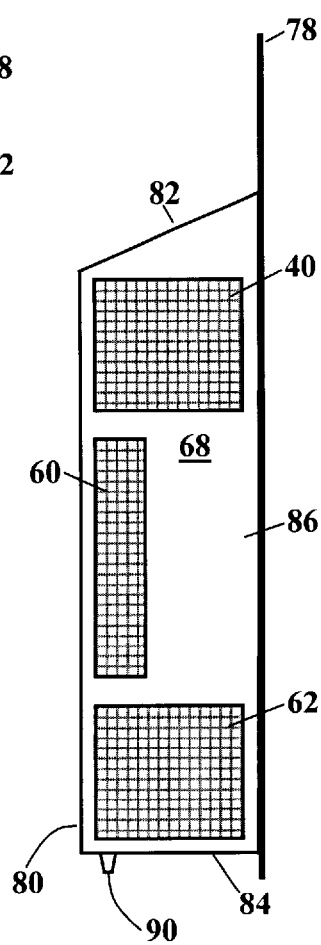

FIG. 8
FIG. 8A      FIG. 8B      FIG. 8C
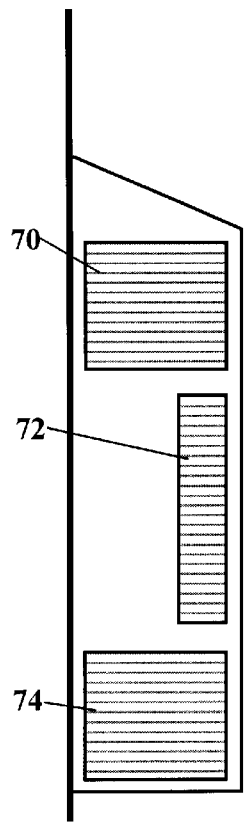
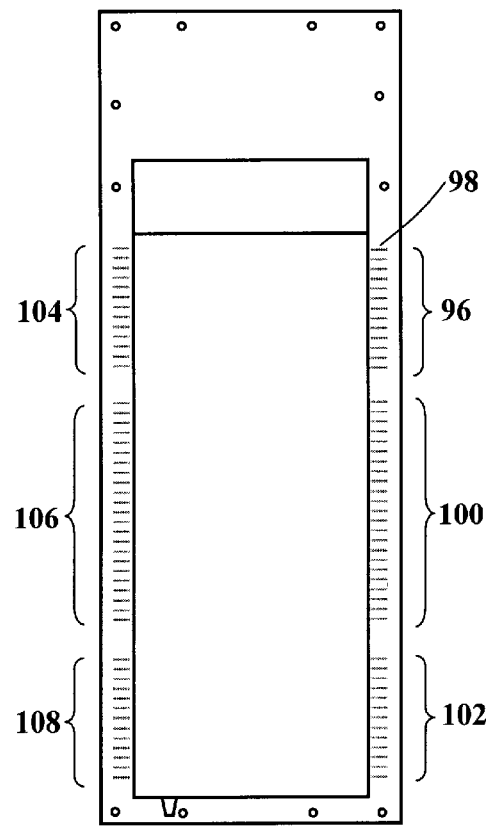
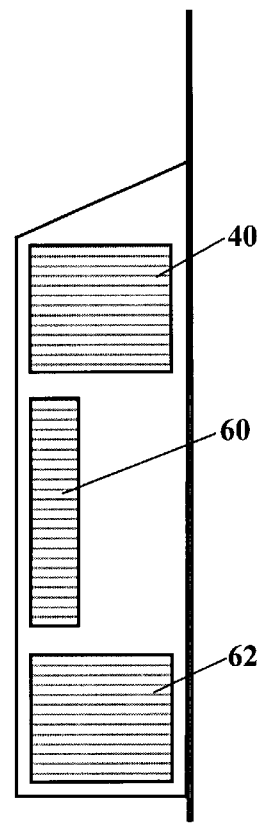

FIG. 9
FIG. 9A 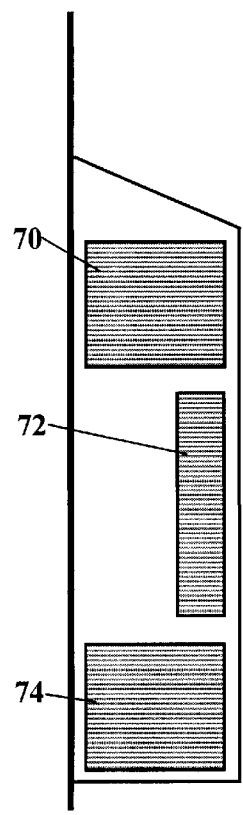 FIG. 9B 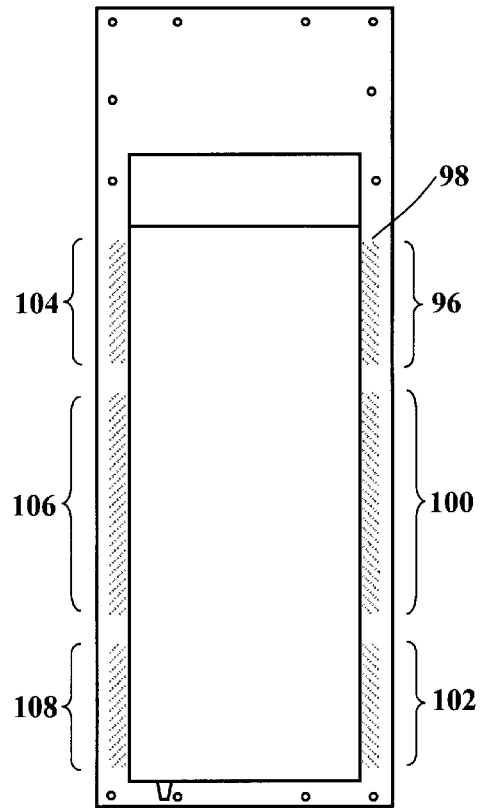 FIG. 9C 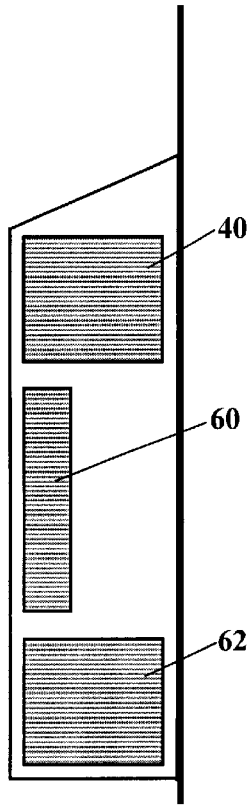

RADIO BASE STATION

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to wireless communications and, more particularly, to heating and cooling radio base stations.

2. Description of the Related Art

Wireless communication has experienced explosive growth. In just a few years cellular telephone usage has soared, and growth continues as wireless Internet access improves. This explosive growth has revolutionized data and voice communication, and manufacturers are continually striving to improve wireless equipment to meet the explosive growth.

Radio base stations are one example of continuously improving wireless equipment. Radio base stations are self-contained enclosures that house transmitters, receivers, and other wireless communication equipment. While radio base stations were originally designed for indoor installations, explosive growth has forced manufacturers to design outdoor radio base stations. These outdoor radio base stations are large, so wireless service providers often seek installation sites on the roofs of buildings. Tall urban buildings provide better transmission and reception while hiding the often aesthetically-unpleasant radio base station.

These outdoor radio base stations, however, are prone to overheating. The roofs of urban buildings are very hot in the summer and very cold in the winter. If the wireless communication equipment is exposed to temperatures lying outside an operating range, the equipment may fail from thermal stress. Some radio base stations have heaters and air conditioners to keep the wireless communication equipment within the operating range. Even with air conditioning, however, light breezes can drastically affect the radio base stations. These breezes blow into the radio base station and frequently cause the wireless communication equipment to fail from overheating. When the wireless communication equipment fails, wireless service is interrupted. An interruption in service irritates customers, disrupts daily business activities, and reduces revenue for the service provider.

FIG. 1 shows the prior art problem that causes radio base stations to thermally fail. FIG. 1 is a schematic drawing of a prior art radio base station 10. The prior art radio base station 10 includes a cabinet 12 that houses wireless communication equipment (not shown for simplicity). An electric fan 14 is shown through a cutaway portion 16 in the cabinet 12. The fan 14 is a component of a heating, ventilating, and air conditioning (HVAC) system that cools the wireless communication equipment (the complete HVAC system, for simplicity, is also not shown). The fan 14 is designed to exhaust air through one or more vents 18 in a hood 20. The problem, however, is that breezes blow through the vents 18 and straight into the fan 14. These breezes, as explained below, eventually cause the wireless communication equipment to fail.

Breezes reverse spin the fan 14. Breezes flow through the hood 20 and into the fan 14. If the fan 14 is not receiving electricity, the breezes spin the fan 14 in reverse. As the fan 14 free-spins in reverse, the fan 14 draws in warm air. When the HVAC system detects rising temperatures in the prior art radio base station 10, an air conditioner turns on and sends alternating current to the fan 14. The fan 14, however, is already spinning in reverse due to the breeze. When alternating current is applied to the reverse-spinning fan 14, the fan 14 does not change direction—fan 14 actually speeds up and continues to reverse spin. The fan 14 has a "squirrel-cage" design which permits the fan 14 to run in either direction. Although the air conditioner is operating, the fan 14 is spinning in reverse and drawing hot air into the air conditioner. The air conditioner quickly becomes ineffective, and the wireless communication equipment exceeds the maximum operating temperature. The prior art radio base station 10 then fails from thermal stress.

This prior art design creates another problem. Ambient air is contaminated with dust his and dirt. The direct flow path from the vents 18 to the fan 14 carries dust and dirt into the air conditioner. The fan 14 clogs and the cooling efficiency of the air conditioner reduces. Even if the HVAC system is filtered, the filter also clogs and obstructs air flow into the HVAC system. The direct flow path from the vents 18 to the fan 14 allows dust and dirt to cascade toward thermal stress failures.

There is, accordingly, a need for a radio base station that has a reduced rate of thermal stress failures, a radio base station that is less susceptible to dust and dirt infiltration, and, yet, a radio base station design that can resolve the prior art problems without extensive tooling or revisions.

BRIEF SUMMARY OF THE INVENTION

The aforementioned problems are minimized by a radio base station having an indirect air flow path. The design of this radio base station eliminates the direct air flow path from the vents to the fan. This indirect flow path substantially reduces the tendency of breezes to reverse-spin the fan. The indirect flow path also helps reduce infiltration of dust and dirt. The HVAC system is more efficient, so thermal stress failures are reduced. The indirect flow path is also quickly and inexpensively implemented in both new and existing radio base stations. The indirect flow path of the present invention reduces failures, improves customer satisfaction and service, and increases revenues for service providers.

The indirect flow path is achieved by relocating the vents. The present invention relocates the vents at approximately right angles to air flow through the fan. Regardless of from what direction breezes blow, the breezes will not encounter a direct path to the fan. The vents are arranged approximately perpendicular to air flow through the fan and, thus, an indirect path is achieved. This approximately perpendicular arrangement reduces reverse free-spinning in the fan.

The indirect path is also achieved by other vent and fan arrangements. The present invention contemplates any arrangement that reduces air from flowing directly into the fan. Whether the vents are arranged at (30 degrees (30°), forty five degrees (45°), sixty degrees (60°), eighty degrees (80°), or any arrangement in between, the air flows indirectly to the fan. This indirect flow path reduces failures in the wireless communication equipment.

BRIEF DESCRIPTION OF THE SEVERAL VIEWS OF THE DRAWINGS

These and other features, aspects, and advantages of the mobile transmitter locator are better understood when the following Detailed Description of the Invention is read with reference to the accompanying drawings, wherein:

FIGS. 5A, 5B, and 5C are, respectively, left side, front, and right side views of the hood 38 shown in FIGS. 3 and 4;

FIGS. 8 and 9 show an alternative embodiment of the present invention; and

DETAILED DESCRIPTION OF THE INVENTION

The present invention is a radio base station less susceptible to overheating by ambient winds. The radio base station includes a cabinet housing wireless communication equipment. A fan is used to cool the wireless communication equipment. One or more vents are arranged substantially perpendicular to air flowing through the fan. These substantially perpendicular vents reduce atmospheric/ocean breezes from entering the radio base station and from overheating the wireless communication equipment. The vents may be louvered to further reduce overheating. The wireless communication equipment transmits frequencies between 806–960 MHz, between 1710–1885 MHz, or between 2500–2690 MHz.

An alternative radio base station is also disclosed. This alternative has a cabinet housing wireless communication equipment, and a fan cooling the wireless communication equipment. The radio base station includes at least one louvered vent having an open position and a closed position, the open position flowing air to or from the fan, and the closed position reducing the flow of air to or from the fan.

Figure 1:
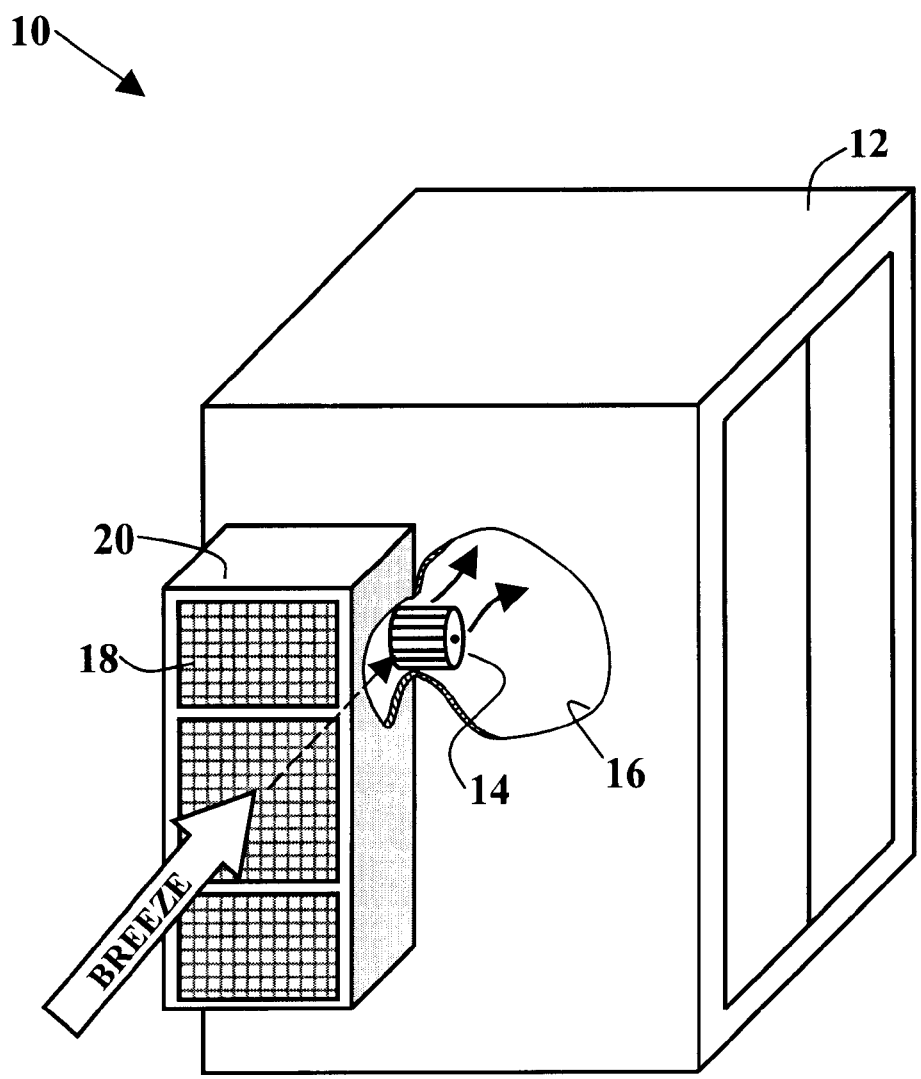
FIG. 1 is a schematic drawing of a prior art radio base station.
Figure 2:
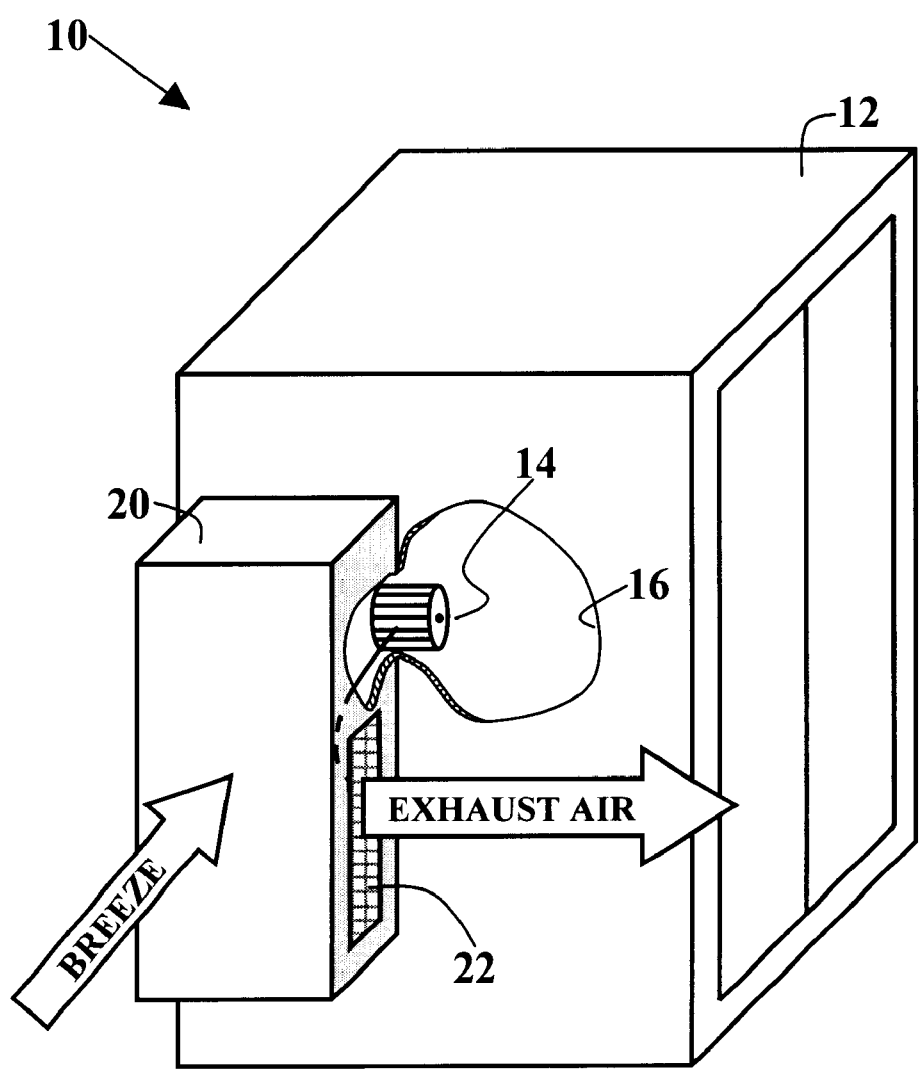
FIG. 2 is a schematic drawing showing one concept of the present invention.

FIG. 2 is a schematic drawing of the indirect flow path. The present invention exhausts air through a side vent 22. The side vent 22 is at approximately right angles to air flow through the fan 14. The fan 14 can still exhaust air, but breezes cannot flow directly into the fan 14. The vent 22 is approximately perpendicular to air flow through the fan 14 and, thus, the ability of the fan 14 to reverse free-spin is substantially reduced. The indirect flow path, of course, contemplates any arrangement that reduces air from flowing directly into the fan 14. Whether the vent 22 is arranged at thirty degrees (30°), forty five degrees (45°), sixty degrees (60°), eighty degrees (80°), or any arrangement in between, the air flows indirectly to the fan 14. This indirect flow path reduces thermal failures in the wireless communication equipment.

Figure 3:
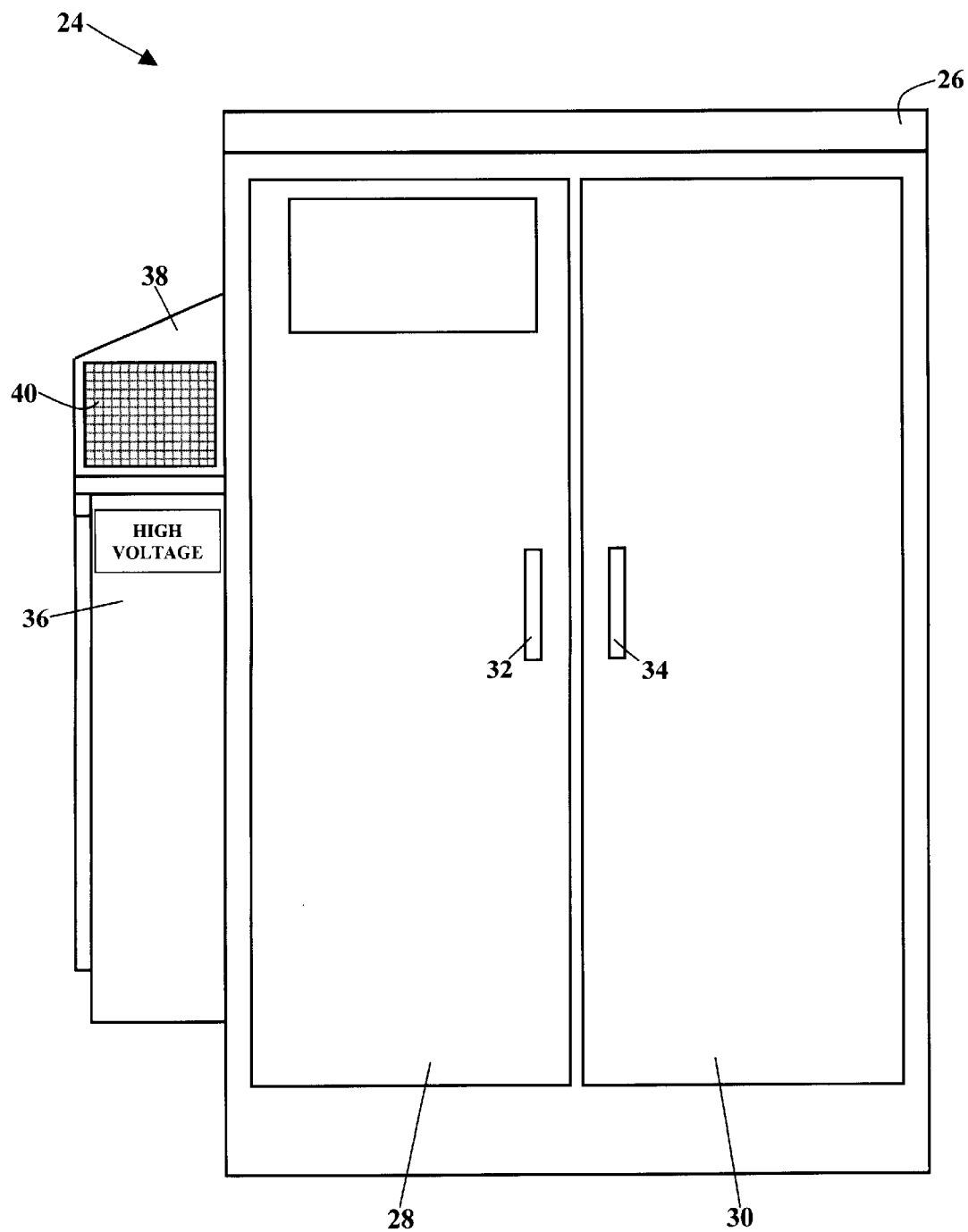
FIG. 3 is a front view of a radio base station incorporating the present invention.

FIG. 3 is a front view of a radio base station 24 incorporating the present invention. The radio base station 24 shown is the Ericsson® RBS 884 family of Time Division Multiple Access products (Ericsson® is a registered trademark of Telefonaktiebolaget LM Ericssonhouses, Telefonv ägen 30, 12625 Stockholm, Sweden, phone: +46 8 719 00 00, www.ericsson.com). Those skilled in the art of wireless communication understand that the Ericsson® 884 family is only a representative example of radio base stations, and that the present invention is equally applicable to other radio base station designs and other radio base station manufacturers.

Those skilled in the art of wireless communication also recognize the present invention is applicable to all wireless communication products, methods, and frequencies. The present invention is applicable to radio base stations utilizing code-division multiple access (CDMA) technologies, time-division multiple access (TDMA) technologies, and the global system for mobile communications (GSM) technology. The present invention is also applicable to radio base stations transmitting and receiving all frequencies in the electromagnetic spectrum and is compatible with the June, 2000 World Radiocommunication Conference agreement on third-generation cellular telephony (806–960 MHz, 1710–1885 MHz, and 2500–2690 MHz). See William Sweet, *Cell phones answer Internet's call*, IEEE SPECTRUM, Aug. 2000, at 43. Radio base stations transmitting and receiving radio frequencies, such as the industrial, scientific, and medical (ISM) band of the electromagnetic spectrum (2.4 GHZ–2.5 GHz) (e.g, "Bluetooth"), are also applicable.

The radio base station 24 has a cabinet 26, with the cabinet 26 including a left door 28 and a right door 30. The left door 28 and the right door 30 have corresponding door latches 32 and 34. The radio base station 24 may include a high-voltage electrical service box 36 for receiving electrical power. As those skilled in the art of wireless communication understand, the cabinet 26 houses wireless electronic equipment for providing wireless service. The radio base station 24 may also include an HVAC hood 38 and one or more vents 40. The one or more vents 40 flow air to heat and to cool the wireless electronic equipment housed within the radio base station 24.

Figure 4:
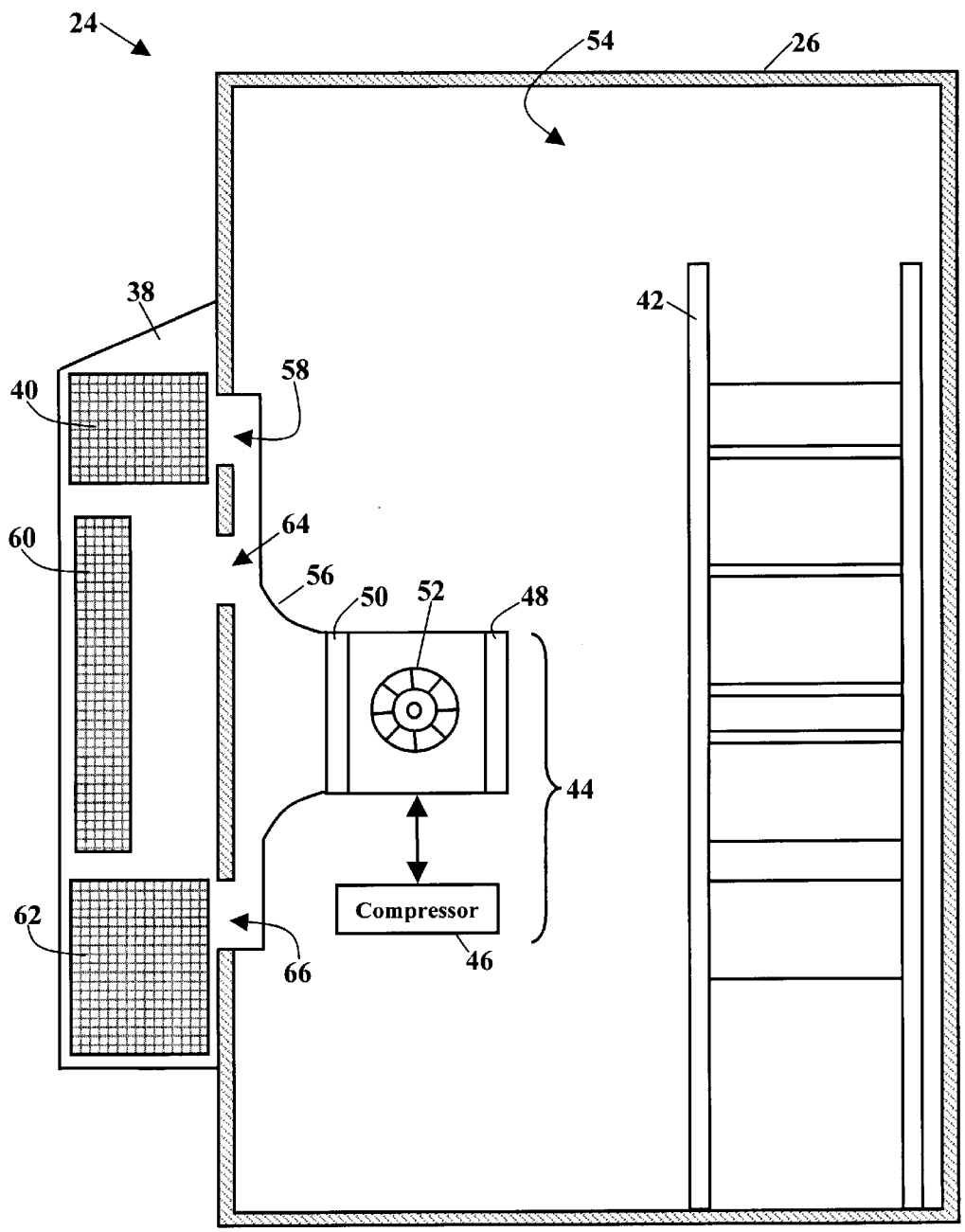
FIG. 4 is a sectional view of the radio base station 24 shown in FIG. 3.

FIG. 4 is a sectional view of the radio base station 24 shown in FIG. 3. The cabinet 26 is sectioned such that the HVAC hood 38 is shown unobstructed by the high-voltage electrical service box (shown as reference numeral 36 in FIG. 3). The sectioned cabinet 26 exposes rack-mounted wireless communication equipment 42 and a Heating, Ventilating, and Air Conditioning (HVAC) system 44. The HVAC system 44 may have four (4) major components: a compressor 46, a first heat exchanger 48, a second heat exchanger 50, and a squirrel cage fan 52. As those skilled in the art have long understood, the HVAC system 44 operates to heat and to cool an interior region 54 of the cabinet 26. The HVAC system 44 has a cooling mode where heat is removed from the interior region 54. See KENNETH WARK, THERMODYNAMICS 716–14 (1983). The HVAC system 44 also has a heating mode where heat is added to the interior region 54. See id Because the operation of the HVAC system 44 is well understood, the HVAC system 44 is simply shown as a block diagram.

The fan 52 flows air to and from the HVAC system 44. The fan 52, for example, forces air through a duct 56, through a passage 58, and out the vent 40. The vent 40, however, is substantially perpendicularly arranged to the flow of air through the fan 52. This substantially perpendicular arrangement reduces atmospheric/ocean breezes from entering the vent 40 and free spinning the fan 52 in reverse. As those skilled in the art understand, if electrical current is applied to the reverse-spinning squirrel cage fan 52, magnetic fields within the fan 52 align and the fan 52 continues to reverse-spin. The substantially perpendicular arrangement of the side vent 42 thus reduces breezes from entering the vent 40, flowing to the passage 58 and entering the duct 56, and then free-spinning the fan 52. The substantially perpendicular arrangement of the vent 40 reduces untreated air from overheating the interior region 54. The substantially perpendicular arrangement of the vent 40 thus reduces fluctuations in the environmental operating range of the electronic equipment 42 housed in the cabinet 26.

As FIG. 4 shows, the radio base station 24 may have multiple side vents and passages. A second vent 60 and a third vent 62 are shown. As those skilled in the art recognize, each vent 40, 60, and 62 may communicate with the passage 58 to flow air to and from the HVAC system 44. Each vent 40, 60, and 62, alternatively, may communicate with multiple passages or even dedicated, ducted passages. The second side vent 60, for example, may only communicate with a second passage 64. The third side vent 62, likewise, may communicate only with a third passage 66. Those skilled in the art recognize the flow of air may be designed to suit any configuration of the HVAC system 44 necessary to heat and cool the interior region 54.

FIGS. 5A, 5B, and 5C are, respectively, left side, front, and right side views of the hood 38 shown in FIGS. 3 and 4. The vents 40, 60, and 62 are arranged in a right side panel 68 and allow air to flow to and from the HVAC system (shown as reference numeral 44 in FIG. 4). Additional vents 70, 72, and 74 in a left side panel 76 may also allow air to flow to and from the HVAC system. The right side panel 68 and the left side panel 76 outwardly extend from a back panel 78 to a front panel 80. A top panel 82 and a bottom panel 84 also outwardly extend from the back panel 78 to the front panel 80. The right side panel 68, left side panel 76, back panel 78, front panel 80, top panel 82, and bottom panel 84 form an enclosure 86. The vents 40, 60, 62, 70, 72, and 74 allow air to flow to and from the enclosure 86. The hood 38 further includes a plurality of openings 88 for attaching the hood 38 to the cabinet (shown as reference numeral 26 in FIGS. 3 and 4). The hood 38 may also include a nozzle 90 through which condensation flows from the HVAC system.

Figure 6:
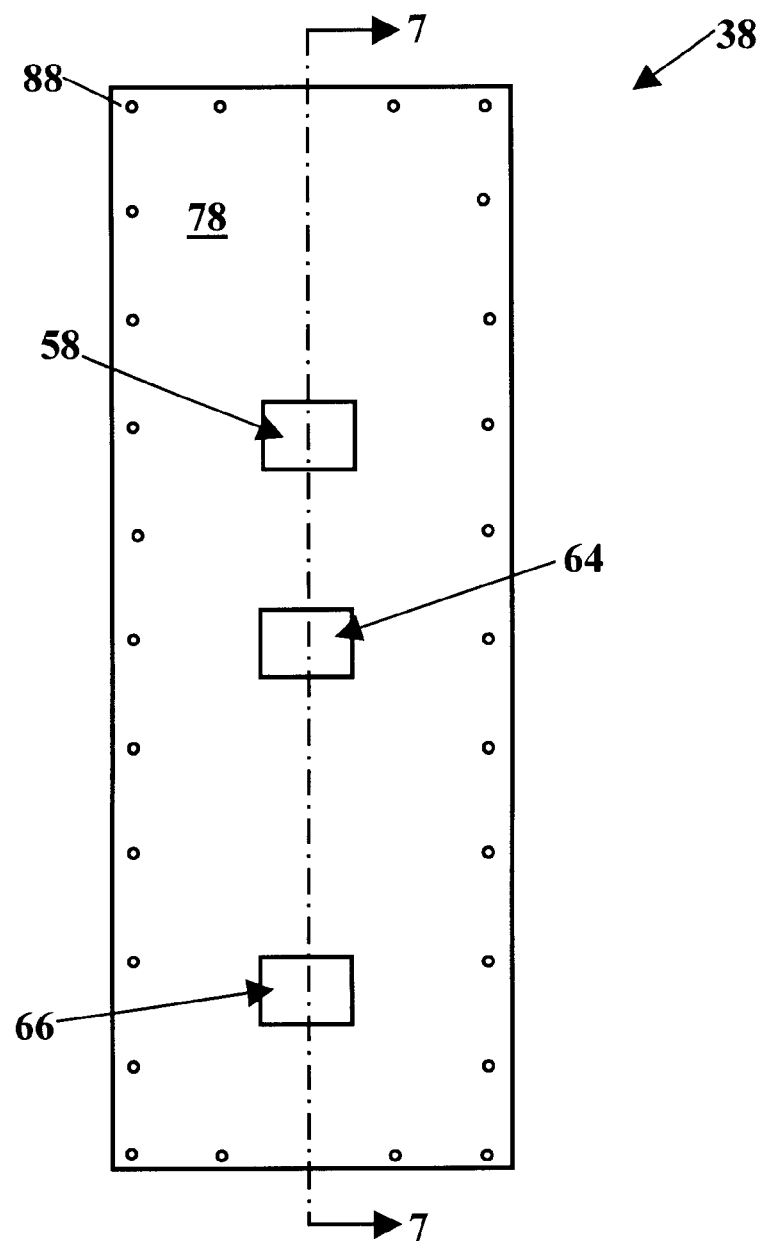
FIG. 6 is a rear view of the hood shown in FIGS. 4 and 5.

FIG. 6 is a rear view of the hood 38. The back panel 78 includes the passage 58. The passage 58 communicates with the HVAC system (shown as reference numeral 44 in FIG. 4) to flow air between the HVAC system and the ambient environment. The back panel 78 may also include the second passage 64 and the third passage 66 to further flow air between the HVAC system and the ambient environment. The plurality of openings 88 are also shown.

Figure 7:
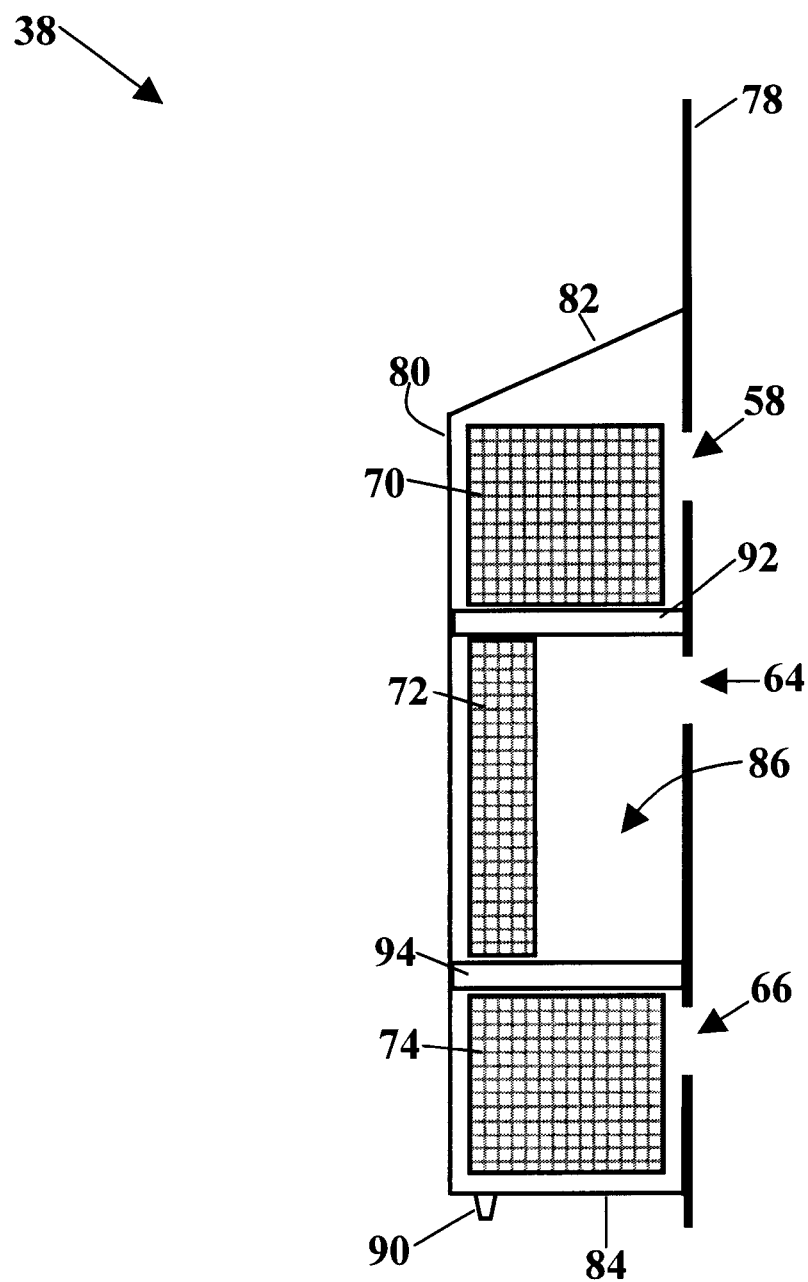
FIG. 7 is a sectional view of the hood taken along Line 7—7 of FIG. 6.

FIG. 7 is a sectional view taken along Line 7—7 of FIG. 6. This sectional view shows the hood 38 may include one or more partitions to channel air flow within the enclosure 86. As those skilled in the art recognize, an upper partition 92 only permits air flow communication between the passage 58 and the vent 70 (and, if desired, the opposite vent shown as reference numeral 40 in FIGS. 3, 4, and 5C). A lower partition 94, likewise, may further channel air flow communication between the second passage 64 and the vent 72 (and, if desired, the opposite vent shown as reference numeral 60 in FIG. 5C). The lower partition 94 would also channel air flow communication between the third passage 66 and the vent 74 (and, if desired, the opposite vent shown as reference numeral 62 in FIG. 5C). HVAC systems are well understood, and those skilled in the art recognize more or less partitions may be used to channel air flow as desired.

FIGS. 8 and 9 show an alternative embodiment of the hood 38. This alternative embodiment utilizes hinged louvers to reduce atmospheric and ocean breezes from free spinning the fan (shown as reference numeral 52 in FIG. 4). The vent 40, for example, includes an array 96 of louvers. Each louver 98 in the array 96 of louvers is hinged to open and allow air flow in one direction. Each louver 98, however, closes when air flows in an opposite direction. FIG. 8 shows the array 96 of louvers in an open position to permit air to flow from the fan and out through the vent 40. If atmospheric or ocean breezes impinge the array 96 of louvers, each louver 98 pivots to a closed position. FIG. 9 shows the array 96 of louvers in the closed position. While FIGS. 8 and 9 show the other vents 60, 62, 70, 72, and 74 with corresponding arrays 100, 102, 104, 106, and 108 of louvers, those skilled in the art understand the HVAC hood 38 may be designed with some vents having arrays of louvers and other vents not having arrays of louvers.

Figure 10:
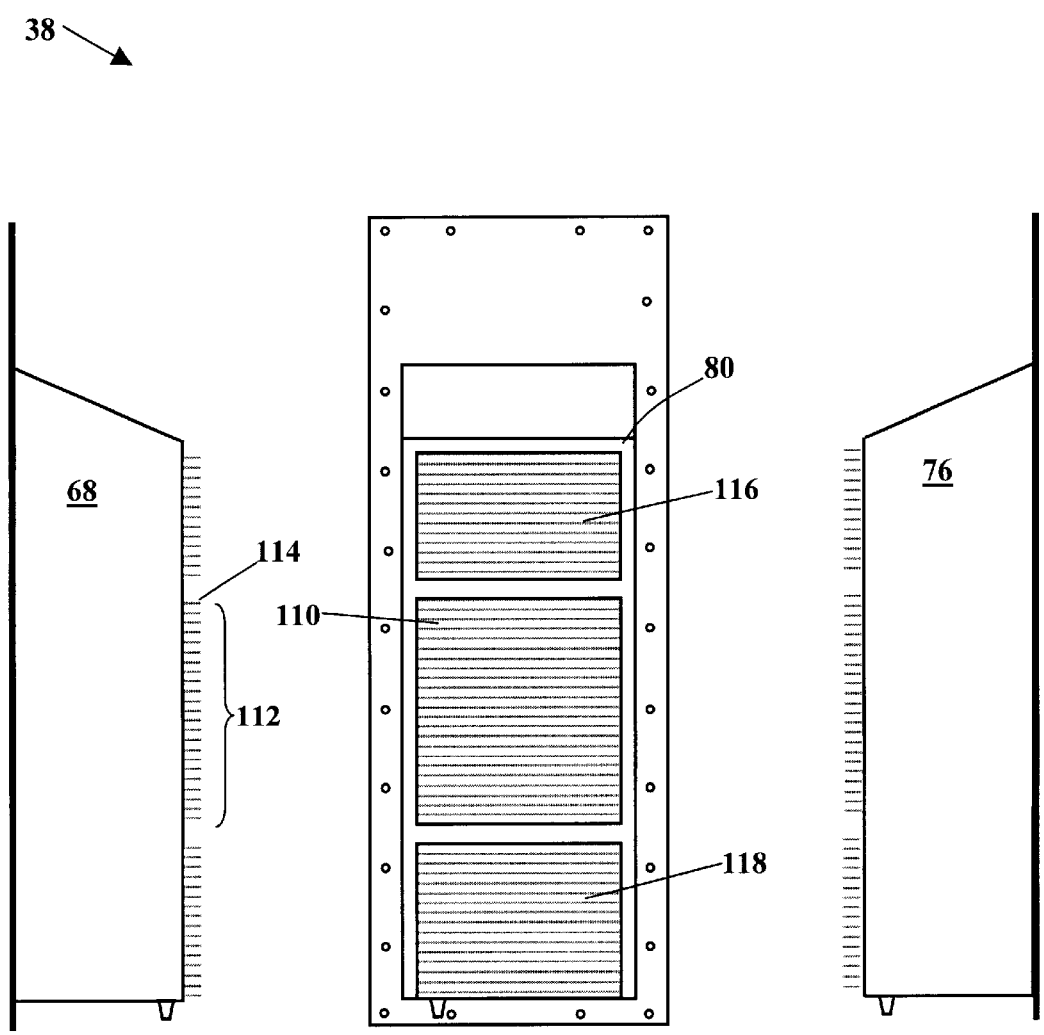
FIG. 10 shows still another alternative embodiment of the present invention.

FIG. 10 shows still another alternative embodiment of the present invention. This alternative embodiment similarly utilizes hinged louvers to reduce atmospheric and ocean breezes from free spinning the fan (shown as reference numeral 52 in FIG. 4). The right side panel 68 and the left side panel 76, however, are shown without vents. The front panel 80 in this embodiment includes at least one louvered front vent 110. FIG. 10 shows an array 112 of louvers in an open position to permit air to flow from the fan and out through the louvered front vent 110. If atmospheric or ocean winds impinge the array 112 of louvers, each louver 114, like those shown in FIG. 9, will close and prevent wind from entering the louvered front vent 110. While FIG. 10 also shows a second louvered front vent 116 and a third louvered front vent 118, those skilled in the art understand the HVAC hood 38 may be designed with any combination of side vents, louvered side vents, and louvered front vents.

The present invention is equally applicable to radio base stations without an HVAC system. The present invention is applicable to natural convection system and a forced-fan system. A natural convection system, for example, would also utilize the perpendicularly arranged vents and the louvered vents described in this patent. A natural convection system, as those skilled in the art understand, heats the wireless communication equipment by solar gain or electrical heat loss. A forced-fan system also utilizes a fan to flow ambient, filtered, or isolated air to the wireless communication equipment.

While this invention has been described with respect to various features, aspects, and embodiments, those skilled and unskilled in the art will recognize the invention is not so limited. Other variations, modifications, and alternative embodiments may be made without departing from the spirit and scope of the following claims.

What is claimed is:

1. A radio base station, comprising:
    a cabinet housing wireless communication equipment;
    a fan cooling the wireless communication equipment; and
    a vent substantially perpendicular to air flow through the fan, the vent including an array of hinged louvers, each of the hinged louvers being hinged to open or close based on a direction of air flow through the fan.

2. A radio base station according to claim 1, wherein the radio base station includes more than one vent substantially perpendicular to air flow through the fan.

3. A radio base station according to claim 1, wherein each of the hinged louvers is hinged to open for flowing air to or from the fan in one direction, and is hinged to close for reducing the flow of air to or from the fan when air flows in an opposite direction.

4. A radio base station according to claim 1, further including a hood containing the vent.

5. A radio base station according to claim 1, wherein the fan is a component of a heating, ventilating, and air conditioning system.

6. A radio base station according to claim 1, wherein the wireless communication equipment transmits frequencies between 806–960 MHz.

7. A radio base station according to claim 1, wherein the wireless communication equipment transmits frequencies between 1710–1855 MHz.

8. A radio base station according to claim 1, wherein the wireless communication equipment transmits frequencies between 2500–2690 MHz.

9. A radio base station according to claim 1, wherein the wireless communication equipment transmits frequencies between 2.4 GHz–2.5 GHz.

10. A radio base station, comprising:
   a cabinet housing wireless communication equipment;
   a fan cooling the wireless communication equipment; and
   at least one louvered vent, wherein the vent includes an array of hinged louvers, each of the louvers is hinged to open for allowing air flow in one direction in the fan, and each of the louvers is hinged to close for preventing atmospheric and ocean breezes from free spinning the fan, when air flows in an opposite direction in the fan.

11. A radio base station according to claim 10, wherein the fan is a component of a heating, ventilating, and air conditioning system.

12. A radio base station according to claim 10, wherein the wireless communication equipment transmits frequencies between 806–960 MHz.

13. A radio base station according to claim 10, wherein the wireless communication equipment transmits frequencies between 1710–1855 MHz.

14. A radio base station according to claim 10, wherein the wireless communication equipment transmits frequencies between 2500–2690 MHz.

15. A radio base station according to claim 10, wherein the wireless communication equipment transmits frequencies between 2.4 GHz–2.5 GHz.

16. A radio base station, comprising:
   a cabinet housing wireless communication equipment;
   a fan cooling the wireless communication equipment; and
   a hood having a vent substantially perpendicular to air flow through the fan, the vent including an array of hinged louvers, each of the hinged louvers being hinged to open or close based on a direction of air flow through the fan.

17. A radio base station according to claim 16, wherein the hood includes more than one vent substantially perpendicular to air flow through the fan.

18. A radio base station according to claim 16, wherein the wireless communication equipment transmits frequencies selected from the group consisting of 806–960 MHz, 1710–1855 MHz, 2500–2690 MHz, and 2.4–2.5 GHz.

19. A radio base station according to claim 16, wherein each of the hinged louvers is hinged to open for flowing air to or form the fan in one direction, and is hinged to close for reducing the flow of air to or from the fan when air flows in the fan in an opposite direction.

* * * * *